(12) United States Patent
Mosandl et al.

(10) Patent No.: US 12,050,440 B2
(45) Date of Patent: Jul. 30, 2024

(54) MACHINE CONTROL BASED ON AUTOMATED LEARNING OF SUBORDINATE CONTROL SKILLS

(71) Applicant: Siemens Aktiengesellschaft, Munich (DE)

(72) Inventors: Judith Mosandl, Neumarkt (DE); Daniel Hein, Munich (DE); Steffen Udluft, Eichenau (DE); Marc Christian Weber, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 304 days.

(21) Appl. No.: 17/598,003

(22) PCT Filed: Mar. 11, 2020

(86) PCT No.: PCT/EP2020/056558
§ 371 (c)(1),
(2) Date: Sep. 24, 2021

(87) PCT Pub. No.: WO2020/193148
PCT Pub. Date: Oct. 1, 2020

(65) Prior Publication Data
US 2022/0171348 A1    Jun. 2, 2022

(30) Foreign Application Priority Data
Mar. 27, 2019   (EP) .................................... 19165521

(51) Int. Cl.
*G05B 13/02*    (2006.01)
*F02C 9/00*     (2006.01)

(52) U.S. Cl.
CPC ............ *G05B 13/0265* (2013.01); *F02C 9/00* (2013.01); *F05D 2220/72* (2013.01);
(Continued)

(58) Field of Classification Search
None
See application file for complete search history.

(56) References Cited

U.S. PATENT DOCUMENTS

| 2010/0325072 A1 | 12/2010 | Truemper |
| 2015/0370227 A1 | 12/2015 | Dull et al. |

(Continued)

FOREIGN PATENT DOCUMENTS

| CN | 106462117 | 2/2017 |
| CN | 106985412 | 7/2017 |

(Continued)

OTHER PUBLICATIONS

Office Action dated Dec. 3, 2021 issued in European Patent Application No. 19165521.6.
(Continued)

*Primary Examiner* — Ryan A Jarrett
(74) *Attorney, Agent, or Firm* — Cozen O'Connor

(57) ABSTRACT

Method and device for controlling a machine in accordance with to multiple control objectives in which machine control is based on automated learning of subordinate control skills, wherein the device provides multiple subordinate control skills which are each assigned to a different one of the multiple control objectives, the device provides multiple learning processes that are reinforcement learning processes that are each assigned to a different one of the multiple control objectives and are configured to optimize the corresponding subordinate control skill based on input data (Continued)

received from the machine, and where the device is configured to determine a superordinate control skill based on the subordinate control skills and to control the machine based on the superordinate control skill.

22 Claims, 2 Drawing Sheets

(52) U.S. Cl.
CPC .... *F05D 2270/082* (2013.01); *F05D 2270/11* (2013.01); *F05D 2270/44* (2013.01)

(56) References Cited

U.S. PATENT DOCUMENTS

| | | | |
|---|---|---|---|
| 2017/0100894 | A1 | 4/2017 | Burns et al. |
| 2017/0261947 | A1 | 9/2017 | Koga |
| 2017/0294133 | A1 | 10/2017 | Jääskeläinen et al. |
| 2018/0267499 | A1 | 9/2018 | Tsuneki et al. |
| 2019/0130263 | A1* | 5/2019 | Düll ..................... G06N 3/045 |
| 2021/0117999 | A1 | 4/2021 | He |

FOREIGN PATENT DOCUMENTS

| | | |
|---|---|---|
| CN | 109039942 | 12/2018 |
| CN | 109087142 | 12/2018 |
| CN | 109143870 | 1/2019 |
| EP | 2172887 A2 | 4/2010 |

OTHER PUBLICATIONS

Dusparic, et al. "Multi-Policy Optimization in Self-Organizing Systems," Self Organizing Architecture, Springer Berlin Heidelberg, Berlin, Heidelberg, pp. 101-126, Sep. 14, 2009.
Search Report dated Nov. 7, 2019 issued in European Patent Application No. 19165521.6.
Search Report and Written Opinion dated Jun. 24, 2020 issued in International Patent Application No. PCT/EP2020/056558.
Chunming et al. "Multiobjective Reinforcement Learning: A Comprehensive Overview", IEEE Transactions On Systems, Man, And Cybernetics: Systems, IEEE, Piscataway, NJ, USA, vol. 45, No. 3, pp. 385-398, Mar. 1, 2015.
Schaefer et al. "A Neural Reinforcement Learning Approach to Gas Turbine Control," Neural Networks, 2007 On, International Joint Conference, IEEE, Piscataway, NJ, USA, pp. 1691-1696, Aug. 1, 2007.
Van Kristof et al. "Multi-Objective Reinforcement Learning using Sets of Pareto Dominating Policies", Journal of Machine Learning Research, pp. 3663-3692, 2014.
PCT International Search Report dated Jun. 24, 2020 based on PCT/EP2020/056558 filed Mar. 11, 2020.

* cited by examiner

MACHINE CONTROL BASED ON AUTOMATED LEARNING OF SUBORDINATE CONTROL SKILLS

CROSS-REFERENCE TO RELATED APPLICATIONS

This is a U.S. national stage of application No. PCT/EP2020/056558 filed 11 Mar. 2020. Priority is claimed on European Application No. 19165521.6 filed 27 Mar. 2019, the content of which is incorporated herein by reference in its entirety.

BACKGROUND OF THE INVENTION

1. Field of the Invention

The present invention relates to industrial automation systems and, more particularly to, devices and methods for controlling a machine.

2. Description of the Related Art

In many industrial applications, control of a machine is needed and the control of the machine may need to be performed in accordance with multiple different control objectives. By way of example, when controlling a gas turbine, a control mechanism may need to consider at least some of the following control objectives: maintaining high efficiency of the gas turbine, reducing carbon monoxide (CO) output of the gas turbine, reducing nitrogen oxide (NOx) output of the gas turbine, reducing vibrations or other undesired dynamic phenomena in the gas turbine, potentially individually for different frequency bands or different components of the gas turbine, improving combined efficiency of a steam cycle and a gas cycle of the gas turbine, and/or increasing lifetime of the gas turbine.

Manually tuning a control algorithm to meet all the different control objectives is a complex task and may be virtually impossible in many practical scenarios. Additionally, manually designing a control strategy for all the individual control objectives may be a cumbersome and costly task, e.g., because in many practical scenarios there is a lack of sufficient data that would enable such a manual design of a suitable control strategy.

One way to enable efficient determination of a control strategy for a machine is utilization of machine learning (ML). For example, an ML technique referred to as reinforcement learning (RL) utilizes available recorded system data to automatically learn an optimized control strategy, also referred to as policy. An RL process for a complex control problem involving multiple different control objectives typically utilizes a global reward function that operates on multiple individual reward inputs corresponding to the different control objective. Designing the global reward function is a critical aspect of the RL process and in typical practical scenarios the resulting global reward function is highly complex. As a consequence, the RL process may become difficult to implement or suffer from instabilities.

Accordingly, there is a need for technologies that allow for efficiently controlling a machine according to multiple control objectives.

SUMMARY OF THE INVENTION

In view of the foregoing, it is an object of the present disclosure to provide a device as defined in claim 1, a method, and a computer program product for controlling a machine in accordance with multiple control objectives.

This and other objects and advantages are achieved in accordance with the invention by a device for controlling a machine according to multiple control objectives, wherein the device is configured to provide multiple subordinate control skills that are each assigned to a different one of the multiple control objectives, provide multiple learning processes that are each assigned to a different one of the multiple control objectives and are configured to optimize the corresponding subordinate control skill based on input data received from the machine, determine a superordinate control skill based on the subordinate control skills and control the machine based on the superordinate control skill.

In this way, the device enables decomposing and thus simplifying a complex control problem associated with the multiple control objectives, so that learning of a suitable control strategy may be accomplished on the level of the subordinate control skills. As a result, the device enables application of efficient and stable learning processes. On the other hand, an efficient overall control strategy can be derived by determining the superordinate control skill based on the optimized subordinate control skills.

In accordance with an embodiment of the device, the learning processes are each based on an individual RL process and the input data comprise an input of a corresponding individual reward function of the RL process. In this way, an RL technique can be efficiently applied to the complex control problem associated with the multiple different control objectives.

In accordance with another embodiment, the device is configured to determine the superordinate control skill by selecting control actions provided by one or more of the subordinate control skills based on the individual reward functions. Alternatively, or in addition, the device is configured to determine the superordinate control skill by combining control actions provided by one or more of the subordinate control skills based on the individual reward functions. In this way, the determination of the superordinate control skill can be accomplished in an efficient manner taking into consideration the individual reward functions used for optimizing the subordinate skills.

In accordance with a further embodiment of the device, the above selecting and/or combining of subordinate control skills is based on maximizing a sum of the individual reward functions. In this way, the superordinate control skill may be efficiently determined in view of an optimized overall reward.

In accordance with yet another embodiment of the device, the above selecting and/or combining is based on maximizing the individual reward function with the lowest value among the individual reward functions. In this way, the superordinate control skill may be efficiently determined in view of worst-case scenarios.

In accordance with an embodiment of the device, the above selecting and/or combining is based on stored past values of the individual reward functions. In this way, the superordinate control skill may be efficiently determined in view of historic information, thereby allowing consideration of relevant scenarios that occurred in the past, e.g., by considering the lowest value among the individual reward functions that occurred over a certain time span, thereby allowing for more reliably addressing possible worst-case scenarios.

In accordance with another embodiment, the device is configured to determine the superordinate control skill based on a superordinate RL process and a superordinate reward function combining the individual reward functions. In this way, an RL technique may be efficiently applied for learning a suitable strategy for determination of the superordinate control skill from the subordinate control skills.

It is also a further object of the invention to provide a method of controlling a machine is provided. The method comprises providing multiple subordinate control skills that are each assigned to a different one of the multiple control objectives, providing multiple learning processes, in particular RL processes that are each assigned to a different one of the multiple control objectives and are configured to optimize the corresponding subordinate control skill based on input data received from the machine, determining a superordinate control skill based on the subordinate control skills, and controlling the machine based on the superordinate control skill.

In this way, the method enables decomposing and thus simplifying a complex control problem associated with the multiple control objectives, so that learning of a suitable control strategy may be accomplished on the level of the subordinate control skills. As a result, the method enables application of efficient and stable learning processes. On the other hand, an efficient overall control strategy can be derived by determining the superordinate control skill based on the optimized subordinate control skills.

In accordance with an embodiment of the method, the learning processes are each based on an individual RL process and the input data comprise an input of a corresponding individual reward function of the RL process. In this way, an RL technique can be efficiently applied to the complex control problem associated with the multiple different control objectives.

In accordance with an embodiment, the method further comprises determining the superordinate control skill by selecting control actions provided by one or more of the subordinate control skills based on the individual reward functions. Alternatively, or in addition, the method may comprise determining the superordinate control skill by combining control actions provided by one or more of the subordinate control skills based on the individual reward functions. In this way, the determination of the superordinate control skill can be accomplished in an efficient manner taking into consideration the individual reward functions used for optimizing the subordinate skills.

In accordance with an embodiment of the method, the above selecting and/or combining of subordinate control skills is based on maximizing a sum of the individual reward functions. In this way, the superordinate control skill may be efficiently determined in view of an optimized overall reward.

In accordance with a further embodiment of the method, the above selecting and/or combining is based on maximizing the individual reward function with the lowest value among the individual reward functions. In this way, the superordinate control skill may be efficiently determined in view of worst-case scenario.

In accordance with another embodiment of the method, the above selecting and/or combining is based on stored past values of the individual reward functions. In this way, the superordinate control skill may be efficiently determined in view of historic information, thereby allowing to consider relevant scenarios that occurred in the past, e.g., by considering the lowest value among the individual reward functions that occurred over a certain time span, thereby allowing for more reliably addressing possible worst-case scenarios.

In accordance with an embodiment, the method comprises determining the superordinate control skill based on a superordinate RL process and a superordinate reward function combining the individual reward functions. In this way, an RL technique may be efficiently applied for learning a suitable strategy for determination of the superordinate control skill from the subordinate control skills.

In the above-disclosed embodiments of the device or method, the machine may comprise or correspond to a gas turbine, an electric power plant, an electric power supply system, factory infrastructure, traffic infrastructure, or an automated driving system. If the machine comprises a gas turbine, then the subordinate control skills may comprise at least one of: a control skill for optimizing efficiency of the gas turbine, a control skill for reducing carbon monoxide output of the gas turbine, a control skill for reducing nitrogen oxide output of the gas turbine, a control skill for reducing vibrations in the gas turbine, a control skill for improving combined efficiency of a steam cycle and a gas cycle of the gas turbine, and/or a control skill for improving lifetime of the gas turbine.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, embodiments of the present disclosure will be described in more detail and with reference to the accompanying drawings, in which.

DETAILED DESCRIPTION OF THE EXEMPLARY EMBODIMENTS

Figure 1:
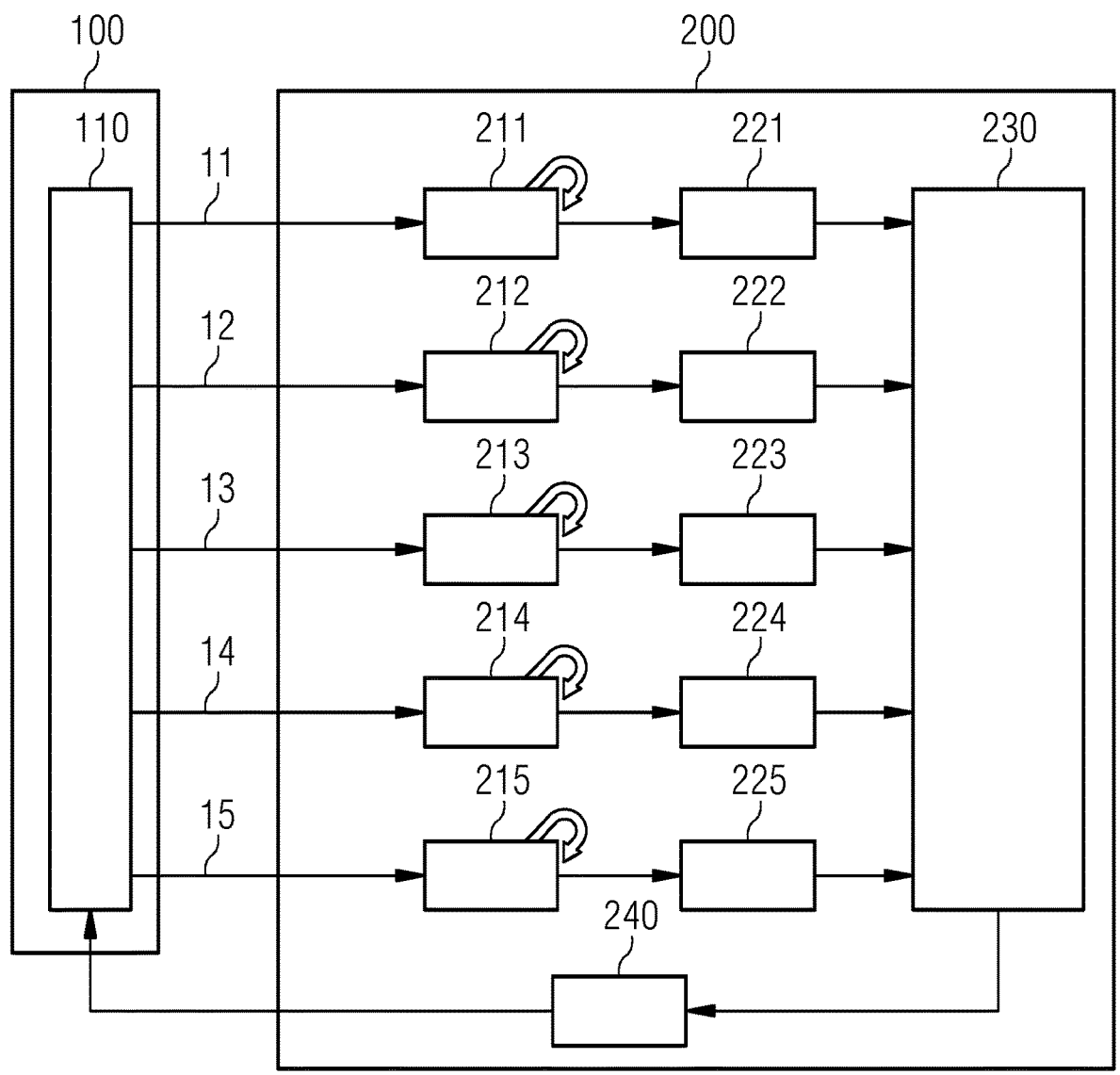
FIG. 1 is a schematic illustration of a control system in accordance with an embodiment of the present invention.

It is noted that in the following detailed description of embodiments the accompanying drawings are only schematic and that the illustrated elements are not necessarily shown to scale. Rather, the drawings are intended to illustrate functions and cooperation of components. Here, it is to be understood that any connection or coupling of functional blocks, devices, components, or other physical or functional elements could also be implemented by an indirect connection or coupling, e.g., via one or more intermediate elements. A connection or coupling of elements or components can for example be implemented by a wire-based, a wireless connection, and/or a combination of a wire-based and a wireless connection. Functional blocks can be implemented by dedicated hardware, by firmware and/or software installed on programmable hardware, and/or by a combination of dedicated hardware and firmware or software.

In the concepts as illustrated in the following, it is assumed that a machine, in particular a gas turbine, is controlled in accordance with multiple different control objectives. However, it is noted that the illustrated concepts are not limited to gas turbines and are also applicable to various other kinds of machines, such as electrical power plants, electrical power supply systems, factory infrastructure, e.g., digital factory infrastructure, traffic infrastructure, or automated driving systems.

When considering the specific example of controlling a gas turbine, the control objectives can include: maintaining high efficiency of the gas turbine, reducing carbon monoxide (CO) output of the gas turbine, reducing nitrogen oxide (NOx) output of the gas turbine, reducing vibrations or other undesired dynamic phenomena in the gas turbine, potentially individually for different frequency bands or different components, e.g., baskets, of the gas turbine, improving combined efficiency of a steam cycle and a gas cycle of the gas turbine, and/or increasing lifetime of the gas turbine.

In the illustrated concepts, the overall control problem associated with simultaneously complying with the multiple different control objectives, e.g., achieving optimized control of the machine, is decomposed by providing multiple subordinate control skills that are each assigned to a corresponding one of the control objectives, and optimizing each subordinate control skill by an individual learning process. The optimized subordinate control skills are then used as a basis for determining a superordinate control skill, e.g., by selecting one or more of the subordinate control skills and/or combining one or more of the subordinate control skills.

In the specific example of controlling a gas turbine, the superordinate control skill may correspond to achieving optimized control of the gas turbine. The subordinate control skills may include the following: a control skill for maintaining high efficiency of the gas turbine, a control skill for reducing CO output of the gas turbine, a control skill for NOx output of the gas turbine, one or more control skills for reducing vibrations or other undesired dynamic phenomena in the gas turbine, potentially individually for different frequency bands or different components, e.g., baskets, of the gas turbine, a control skill for improving combined efficiency of a steam cycle and a gas cycle of the gas turbine, and/or a control skill for increasing lifetime of the gas turbine.

The learning processes for optimizing the subordinate control skills may each be based on an RL technique, i.e., correspond to RL processes. In each RL process, a corresponding individual reward function, also referred to as action-value function, is assigned to the corresponding control skill. The reward function represents the value of the performed control action, i.e., how good the control action is in view of the underlying control objective. The RL processes may, for example, apply an iterative method such as Neural Fitted Q Iteration (NQF) to learn an optimized or optimal control policy that maximizes the return from the reward function.

The superordinate control skill, which is applied for controlling the machine at runtime to select control actions, may be determined by selecting among the possible control actions provided by the subordinate control skills, the control action or the combination of control actions, which is most suitable in view of the current status of the machine. The selection may be automated or at least in part be based on manual user input. The selection may be based on the following criteria:

a weighted sum maximization, e.g., by selecting the control action(s) yielding the highest combined reward over all individual reward functions;

a worst case optimization: selecting the control action(s) maximizing the individual reward function currently having the lowest value;

a history-based selection: selecting the control action(s) improving the individual reward function of the control skill having the lowest value individual reward function over a certain time span in the past.

In some scenarios, the superordinate control skill may also be determined on the basis of a learning process, in particular an RL process. This may be accomplished by first relabeling the historic data recorded from the machine according to the control actions provided by the subordinate control skills. These data may then be used as an input to a superordinate RL process, where the action space is defined as a probability vector over all subordinate control skills. The probability vector may indicate, for each of the subordinate control skills, a probability of the respective control being triggered by this subordinate control skill. The superordinate RL process may be based on a superordinate reward function composed from the individual reward functions of the subordinate skills, e.g., by using a projection to a scalar output value.

FIG. 1 schematically illustrates a control system that implements the concepts as outlined above. Specifically, FIG. 1 illustrates the controlled machine 100, e.g., a gas turbine, and a control management tool 200. For implementing various control actions, the machine 100 is provided with a controller 110.

The control management tool 200 receives input data 11, 12, 13, 14, 15 from the machine 100, in particular from the controller 110. The input data may correspond to reward values of the above-mentioned individual reward functions. Further, the input data 11, 12, 13, 14, 15 may include information on the state of the machine 100.

As illustrated, the input data 11, 12, 13, 14, 15 are provided to multiple RL processes 211, 212, 213, 214, 215. Specifically, the input data 11 are provided to the RL process 211, the input data 12 are provided to the RL process 212, the input data 13 are provided to the RL process 213, the input data 14 are provided to the RL process 214, and the input data 15 are provided to the RL process 215. Accordingly, the RL processes 211, 212, 213, 214, 215 may each receive individual input data 11, 12, 13, 14, 15 from the machine.

The RL processes 211, 212, 213, 214, 215 each optimize a corresponding subordinate control skill 221, 222, 223, 224, 225. Specifically, the RL process 211 optimizes the subordinate control skill 221, the RL process 212 optimizes the subordinate control skill 222, the RL process 213 optimizes the subordinate control skill 223, the RL process 214 optimizes the subordinate control skill 224, and the RL process 215 optimizes the subordinate control skill 225.

The subordinate control skills 221, 222, 223, 224, 225 are each assigned to a specific one of the multiple control objectives upon which control of the machine 100 is based. In the above-mentioned example of controlling a gas turbine, the subordinate control skill 221 may be a control skill for maintaining high efficiency of the gas turbine, the subordinate control skill 222 may be a control skill for reducing CO output of the gas turbine, the subordinate control skill 223 may be a control skill for NOx output of the gas turbine, the subordinate control skill 224 may be a control skill for reducing vibrations or other undesired dynamic phenomena in the gas turbine, potentially individually for a certain frequency band or component, e.g., basket, of the gas turbine, and the subordinate control skill 225 may be control skill for increasing lifetime of the gas turbine.

The input data 11, 12, 13, 14, 15 may in this case include the following: The input data 11 may include rewards and state information relevant for maintaining high efficiency of the gas turbine. The input data 12 may include rewards and state information relevant for reducing CO output of the gas turbine. The input data 13 may include rewards and state information relevant for reducing NOx output of the gas turbine. The input data 14 may include rewards and state information relevant for reducing vibrations or other undesired dynamic phenomena in the gas turbine. The input data 14 may include rewards and state information relevant for increasing lifetime of the gas turbine.

As further illustrated, the control management tool 200 further includes a combination stage 230 that combines the individual control skills 221, 222, 223, 224, 225 to a superordinate control skill 240. This may involve selection and/or combination of control actions triggered by the subordinate control skills 221, 222, 223, 224, 225.

The selection for determining the superordinate control skill 240 may be automated or at least in part be based on manual user input. The selection involves selecting the control action(s) yielding the highest combined reward over all individual reward functions of the RL processes 211, 212, 213, 214, 215, selecting the control action(s) maximizing the individual reward function currently having the lowest value, or selecting the control action(s) improving the individual reward function having the lowest value over a certain time span in the past.

In some scenarios, the combination stage 230 may determine the superordinate control skill 240 on the basis of a superordinate RL process. Input data of the superordinate RL process may then include state information recorded from the machine 100 and associated control actions triggered by the subordinate control skills 221, 222, 223, 224, 225. As mentioned above, the superordinate RL process may be based on an action space defined by the different subordinate control skills which triggered the control actions and a reward function composed from the individual reward functions of the subordinate control skills 221, 222, 223, 224, 225.

As further illustrated, the machine 100 is controlled based on the superordinate control skill 240. This may involve providing control policies corresponding to the superordinate control skill 240 to the machine 100. Alternatively, the control management tool 200 could also directly trigger control actions based on the superordinate control skill 240, e.g., by providing corresponding control signals to the machine 100.

Figure 2:
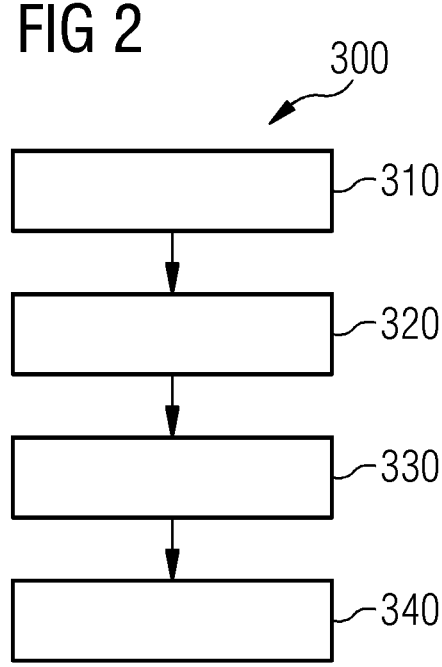
FIG. 2 is a flowchart of the method in accordance with an embodiment of the present invention.

FIG. 2 shows a flowchart for illustrating a method 300 that can be used for implementing the illustrated concepts in a device, such as in the above-mentioned control management tool 200. The method may, for example, be implemented by execution of program code by one or more processors of the device. The program code can be stored in a memory of the device.

At block 310, multiple subordinate control skills are provided, such as the above-mentioned subordinate control skills 221, 222, 223, 224, 225. Each of the control skills is assigned to a different one of multiple control objectives for controlling a machine, e.g., the above-mentioned machine.

At block 320, multiple learning processes are provided. Each of the learning processes is assigned to a different one of the multiple control objectives and is configured to optimize the corresponding subordinate control skill based on input data received from the machine. The learning processes may correspond to RL processes, such as the above-mentioned RL processes 211, 212, 213, 214, 215. Specifically, the learning processes may each be based on an individual RL process and the input data comprise an input of a corresponding individual reward function of the RL process.

At block 330, a superordinate control skill, such as the above-mentioned superordinate control skill 240, is determined based on the subordinate control skills. The superordinate control skill may be determined based on the individual reward functions by selecting control actions provided by one or more of the subordinate control skills. Alternatively or in addition, the superordinate control skill may be determined based on the individual reward functions by combining control actions provided by one or more of the subordinate control skills.

The above selecting and/or combining of block 330 may be based on maximizing a sum of the individual reward functions. Alternatively, the selecting and/or combining of block 330 may be based on maximizing the individual reward function with the lowest value among the individual reward functions. Further, the selecting and/or combining of block 330 may be based on stored past values of the individual reward functions.

In some scenarios, the superordinate control skill may be determined based on a superordinate RL process and a superordinate reward function combining the individual reward functions.

At block 340, the machine is controlled based on the superordinate control skill determined at block 330. This may involve providing a control policy corresponding to the superordinate control skill to the machine or generating control signals for controlling the machine in accordance with the superordinate control skill.

Figure 3:
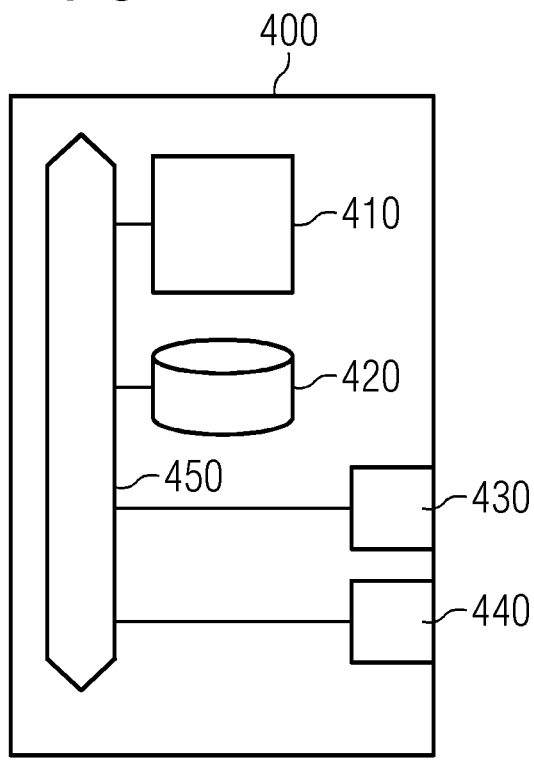
FIG. 3 is a schematic block diagram of the structure of the device in accordance with the invention.

FIG. 3 shows a block diagram for schematically illustrating structures of a device 400. The device 400 may, for example, be used for implementing the above-mentioned control management tool 200. The device 400 may, for example, be implemented as a computer or computer-based system. In the illustrated example, the device 400 includes at least one processor 410 and a memory 420. Further, the device 400 includes at least one data interface 430, which may be used for obtaining the above-mentioned input data and for providing control information to the controlled machine. Further, the device 400 may also include a user interface 440, e.g., for allowing configuration of the learning processes or for allowing configuration of the process of determining the superordinate control skill from the subordinate control skills. The components of device 400, i.e., the at least one processor 410, the memory 420, the at least one data interface 430, and the user interface 440 may, for example, be coupled to each other by a data bus 450 or similar internal communication infrastructure of the device 400. By execution of program code by the at least one processor 410, the device 400 may be configured to operate in accordance with the above-described functionalities of the control management tool 200 and/or implement the method 300 as explained in connection with FIG. 2. A computer program product, e.g., in the form of a computer-readable storage medium, may store such program code in a non-transitory manner and may be used to provide the program code to the device 400.

It is to be understood that the above description of examples is intended to be illustrative and that the illustrated concepts are susceptible to various modifications. For example, the illustrated concepts could be applied to controlling various types of machine or machine systems. Further, the concepts may be applied to various types and numbers of different control objectives.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for controlling a machine in accordance with multiple control objectives, comprising:
a processor; and
memory;
wherein the device is configured to:
provide multiple subordinate control skills, each control skill of the multiple subordinate control skills being assigned to a different control objective of the multiple control objectives;
provide multiple learning processes, each learning process of the multiple learning processes being assigned to a different control objective of the multiple control objectives and being configured to optimize a corresponding subordinate control skill based on input data received from the machine;
determine a superordinate control skill based on the multiple subordinate control skills; and
control the machine based on the superordinate control skill.

2. The device according to claim 1, wherein the learning processes are each based on an individual reinforcement learning process and the input data comprise an input of a corresponding individual reward function of the individual reinforcement learning process.

3. The device according to claim 2, wherein the device is further configured to determine the superordinate control skill by selecting control actions provided by at least one subordinate control skill of the subordinate control skills based on the individual reward functions.

4. The device according to claim 2, wherein the device is further configured to determine the superordinate control skill by combining control actions provided by at least one subordinate control skill of the subordinate control skills based on the individual reward functions.

5. The device according to claim 3, wherein the device is further configured to determine the superordinate control skill by combining control actions provided by at least one subordinate control skill of the subordinate control skills based on the individual reward functions.

6. The device according to claim 3, wherein at least one of said selecting and combining is based on maximizing a sum of the individual reward functions.

7. The device according to claim 4, wherein at least one of said selecting and combining is based on maximizing a sum of the individual reward functions.

8. The device according to claim 3, wherein at least one of said selecting and combining is based on maximizing the individual reward function with a lowest value among the individual reward functions.

9. The device according to claim 4, wherein at least one of said selecting and combining is based on maximizing the individual reward function with a lowest value among the individual reward functions.

10. The device according to claim 3, wherein at least one of said selecting and combining is based on stored past values of the individual reward functions.

11. The device according to claim 4, wherein at least one of said selecting and combining is based on stored past values of the individual reward functions.

12. The device according to claim 6, wherein at least one of said selecting and combining is based on stored past values of the individual reward functions.

13. The device according to claim 8, wherein at least one of said selecting and combining is based on stored past values of the individual reward functions.

14. The device according to claim 2, wherein the device is further configured to determine the superordinate control skill based on a superordinate reinforcement learning process and a superordinate reward function combining the individual reward functions.

15. The device according to claim 1, wherein the machine comprises a gas turbine and the subordinate control skills comprise at least one of (i) a control skill for optimizing efficiency of the gas turbine, (ii) a control skill for reducing carbon monoxide output of the gas turbine, (iii) a control skill for reducing nitrogen oxide output of the gas turbine, (iv) a control skill for reducing vibrations in the gas turbine, (v) a control skill for improving combined efficiency of a steam cycle and a gas cycle of the gas turbine, and (vi) a control skill for improving lifetime of the gas turbine.

16. A method of controlling a machine, the method comprising:
providing multiple subordinate control skills, each control skill of the multiple subordinate control skills being assigned to a different control objective of the multiple control objectives;
providing multiple learning processes, each learning processes of the learning processes being assigned to a different control objective of the multiple control objectives and being configured to optimize a corresponding subordinate control skill based on input data received from the machine;
determining a superordinate control skill based on the subordinate control skills; and
controlling the machine based on the superordinate control skill.

17. The method according to claim 16, wherein the learning processes are each based on an individual reinforcement learning process and the input data comprise an input of a corresponding individual reward function of the reinforcement learning process.

18. The method according to claim 17, wherein the device is configured to determine the superordinate control skill by at least one of (i) selecting control actions provided by at least one control skill of the subordinate control skills based on the individual reward functions and (ii) combining control actions provided by at least one control skill of the subordinate control skills based on the individual reward functions.

19. The method according to claim 18, wherein at least one of said selecting and combining is based on maximizing a sum of the individual reward functions, on maximizing the individual reward function with the lowest value among the individual reward functions, or on stored past values of the individual reward functions.

20. The method according to claim 17, further comprising:
    determining the superordinate control skill based on a superordinate reinforcement learning process and a superordinate reward function combining the individual reward functions.

21. The method according to claim 16, wherein the machine comprises a gas turbine and the subordinate control skills comprise at least one of (i) a control skill for optimizing efficiency of the gas turbine, (ii) a control skill for reducing carbon monoxide output of the gas turbine, (iii) a control skill for reducing nitrogen oxide output of the gas turbine, (iv) a control skill for reducing vibrations in the gas turbine, (v) a control skill for improving combined efficiency of a steam cycle and a gas cycle of the gas turbine, and (vi) a control skill for improving lifetime of the gas turbine.

22. A non-transitory computer-readable medium comprising program code which, when executed by at least one processor causes the processors to control a machine in accordance with multiple control objectives, the program code comprising:
    program code for providing multiple subordinate control skills, each control skill of the multiple subordinate control skills being assigned to a different control objective of the multiple control objectives;
    program code for providing multiple learning processes, each learning processes of the learning processes being assigned to a different control objective of the multiple control objectives and being configured to optimize a corresponding subordinate control skill based on input data received from the machine;
    program code for determining a superordinate control skill based on the subordinate control skills; and
    program code for controlling the machine based on the superordinate control skill.

* * * * *